UNITED STATES PATENT OFFICE 2,240,403

PROCESS FOR TREATMENT OF SO-CALLED WHITE WATER

Adolf Magnus Rupert Karlström, Gothenburg, Sweden

No Drawing. Application January 27, 1938, Serial No. 187,321. In Sweden February 6, 1937

1 Claim. (Cl. 210—2)

The present invention relates to processes for treatment of so-called white water, which flows through the wire of the Fourdrinier or cylindrical type when a suspension containing fibres is drained on the wire in the manufacture of paper, cellulose, ground wood-pulp, carton and other fibre products. This white water, which term also includes waste water and backwater or circulation water, is a dilute suspension in which the suspended matters consist of small particles such as fibres, loading and sizing materials and dye stuffs, and it is the main object of the present invention to facilitate the recovering of these particles from the water. According to the invention sulphonated organic products or salts or derivatives thereof are added to the white water for the principal purpose of flocculating the particles, As a consequence of this flocculation of the particles these will be better adapted to be recovered in savealls of various systems and also to be retained on the wire after being returned to the "original" stuff.

The substances here referred to in the first instance include fairly high-molecular sulphonated organic compounds, i. e. their formula includes suitably at least 16 C-atoms. They may consist of sulphonated vegetable, animal and mineral oils, sulphonated fatty substances, their salts and derivatives, and sulphonated petroleum acids and naphthenic acids and their salts and derivatives. Substances of this class, which in the claim are termed "sulphonated organic products" may be used alone or together with organic oils, fats or waxy substances, which are not sulphonated, such as petroleum, paraffin oil, pine oil, Montan-wax or other suitable oils, fats or kinds of waxes. This class of substances, which in the claim are termed "non-sulphonated organic products," may, if desired, be dissolved or emulsified in the sulphonated oil.

The sulphonated organic products may be supplied to the water in the form of their water-soluble free acids or their soluble salts as, for instance, ammonium or alkali salts. As an example of a sulphonated product for the present purpose sulphonated castor oil or derivatives thereof may be mentioned.

The amount of sulphonated oil used does not exceed 0.02% of the white water to be treated. The process is carried out at normal room temperatures and heating of the white water is not required.

The purpose of this treatment of white water is:

(1) To assist in or cause the flocculation of the small particles in the water;

(2) To give the flocs formed the coherence required.

As regards the recovering of the particles from the waste water by means of flotation, the addition of the substances in question also has the following purposes:

(1) To give the flocs such a nature as to give the air or gas bubbles a tendency to adhere to same;

(2) To cause a reduction of the surface-tension of the water.

It is of importance for the flocculation that the white water contains aluminum-ions or insoluble or colloidal aluminum compounds, for instance aluminum-hydrate. Sometimes the water from the wire contains the required quantity of aluminum-ions or aluminum-hydroxide respectively. If the water is too acid for the formation of aluminum-hydroxide, a suitable quantity of alkali or earth alkali may be added. If the water is alkaline it may be made acid by a suitable addition of alum.

In lieu of aluminum compounds, compounds of other earth metals, rare earth metals, alkaline earth metals and iron and chromium compounds or other suitable metal compounds may be used.

The course in the treatment of the white water appears to be explained by the following:

In unflocculated condition the substance suspended in the water as a rule has a negative electrostatic charge. By addition of alum and alkali if required, the particles are flocculated and covered by a positively charged film of aluminum-hyroxide. These positively charged flocs will then be brought together to larger units by the sulphonated organic product added which constitutes a negative colloid and will be precipitated itself on the flocs. If the water already contains alum in required quantity but is too acid for the formation of aluminum-hydroxide, of course only a suitable quantity of alkali need to be added for the precipitation of aluminum-hydrate.

In some cases, when alum or sulphuric acid is in excess in the water, with a pH-value under 4, it appears to be necessary to add only a negative colloid for instance sulphonated castor oil since the solid particles have a positive charge for the flocculation. If the solid particles of white water have a negative charge, the particles must be coated with a positively charged aluminum-hydroxide before the addition of the nated oil. The pH-value of the white in such a case must be between 4 and 6.

alkaline white water which has a pH- of more than 7, it is practically impossible ain any flocculation by negative colloids s sulphonated oils.

he recovering of suspended particles in water by flotation with the aid of air or bbles, which flotation may be carried out atmospheric or reduced pressure, a very inding of the air or gas bubbles by the n of the substances in question is ef- This addition may, for instance, take it the same time as or immediately before r the introduction of air or gas into the water. The sulphonated organic products the addition may be very dilute in water r to facilitate the mixing of small quanti- same in the waste water. In order to conversion of the sulphonated oil with r magnesia in the diluting water, the former may, however, in an undilute or relatively slightly dilute condition be introduced in the waste water in a finely divided state with the aid of air or steam.

In the recovery of the particles from waste water by filtering as in the employment of settling or deposit tanks for the same purpose, the addition of the substances in question may also be useful.

What I claim is:

A process in the manufacture of paper, cellulose, ground wood-pulp, carton and other fiber products consisting of adding an aluminum compound to the white water having a pH-value between 4 and 6 and adding a sufficient amount of a sulphonated oil to said white water in the presence of said metallic compound for flocculating the solid particles in said water to enable the reclaiming thereof for reuse.

ADOLF MAGNUS RUPERT KARLSTRÖM